United States Patent [19]
Holmes et al.

[11] Patent Number: 5,946,615
[45] Date of Patent: Aug. 31, 1999

[54] MOBILE NETWORK GEOGRAPHIC ADDRESS TRANSLATION

[75] Inventors: David William James Holmes, Redmond; Ileana A. Leuca, Bellevue, both of Wash.

[73] Assignee: AT&T Wireless, Kirkland, Wash.

[21] Appl. No.: 08/727,728

[22] Filed: Oct. 8, 1996

[51] Int. Cl.$^6$ .................................................. H04Q 7/22
[52] U.S. Cl. ........................................ 455/412; 455/445
[58] Field of Search .......................... 455/4.1, 4.2, 412, 455/413, 428, 432, 433, 445, 456, 457

[56] References Cited

U.S. PATENT DOCUMENTS

| | | | |
|---|---|---|---|
| 5,235,633 | 8/1993 | Dennison et al. | 455/456 |
| 5,396,540 | 3/1995 | Gooch | 455/456 |
| 5,432,542 | 7/1995 | Thibadeau et al. | 348/6 |
| 5,506,887 | 4/1996 | Emery et al. | 455/461 |
| 5,510,978 | 4/1996 | Colgan | 705/12 |
| 5,515,419 | 5/1996 | Sheffer | 455/456 |
| 5,519,760 | 5/1996 | Borkowski et al. | 455/404 |
| 5,524,136 | 6/1996 | Bar-Noy et al. | 455/456 |
| 5,548,814 | 8/1996 | Lorang et al. | 455/38.1 |
| 5,852,775 | 12/1998 | Hidary | 455/404 |

FOREIGN PATENT DOCUMENTS

| | | | |
|---|---|---|---|
| WO 96/25830 | 8/1996 | WIPO | H04Q 7/38 |

*Primary Examiner*—Andrew M. Dolinar

[57] ABSTRACT

The present invention is a system and method of providing the information necessary for geographically-based mobile services by translating public geographic information to corresponding mobile network structure. When an indication of a geographic area is received, the indication is translated to an indication of a portion of the mobile network corresponding to the geographic area and an indication of the service is transmitted to the indicated portion of the mobile network. In a preferred embodiment, a broadcast message is transmitted over a mobile network to a plurality of mobile stations within a geographic area. When the system receives a message to be broadcast and an indication of the geographic area of the broadcast, the indication of the geographic area is translated to an indication of a portion of the mobile network corresponding to the geographic area. The message is then transmitted to the indicated portion of the mobile network.

24 Claims, 7 Drawing Sheets

5,946,615

1

MOBILE NETWORK GEOGRAPHIC ADDRESS TRANSLATION

FIELD OF THE INVENTION

The invention relates to providing geographically-based services within a mobile network, and in particular, to translation of public geographic information to corresponding mobile network structure.

BACKGROUND OF THE INVENTION

Currently, the delivery of messages, such as telephone calls, pages, e-mail, etc., in point-to-point mobile communications, uses a conventional telephone number or e-mail address to identify the destination mobile station. The conventional telephone number or e-mail address is used to access geographically-based routing information which is based on the actual location of mobile station within the wireless network. This location and the corresponding geographic routing are not available to the sender of the message or the mobile subscriber at the destination mobile station. Indeed, mobile service providers have traditionally kept such information confidential and have not provided mechanisms by which such information can easily be obtained or used.

Because of this, current mobile networks are not capable of providing geographically-based services. Such services require the ability to deliver messages on the basis of a geographic address, such as a specific location, rather than on the basis of the conventional telephone number or e-mail address. One such service is the transmission of messages which are broadcast to all mobile stations within a geographic area. A need arises for a mechanism which provides the information necessary for geographically-based services.

SUMMARY OF THE INVENTION

The present invention is a system and method of providing the information necessary for geographically-based mobile services by translating public geographic information to corresponding mobile network structure. When an indication of a geographic area is received, the indication is translated to an indication of a portion of the mobile network corresponding to the geographic area and an indication of the service is transmitted to the indicated portion of the mobile network.

In a preferred embodiment, a broadcast message is transmitted over a mobile network to a plurality of mobile stations within a geographic area. When the system receives a message to be broadcast and an indication of the geographic area of the broadcast the indication of the geographic area is translated to an indication of a portion of the mobile network corresponding to the geographic area. The message is then transmitted to the indicated portion of the mobile network.

BRIEF DESCRIPTION OF THE DRAWINGS

The details of the present invention, both as to its structure and operation, can best be understood by referring to the accompanying drawings, in which like reference numbers and designations refer to like elements.

2

Figure 1:
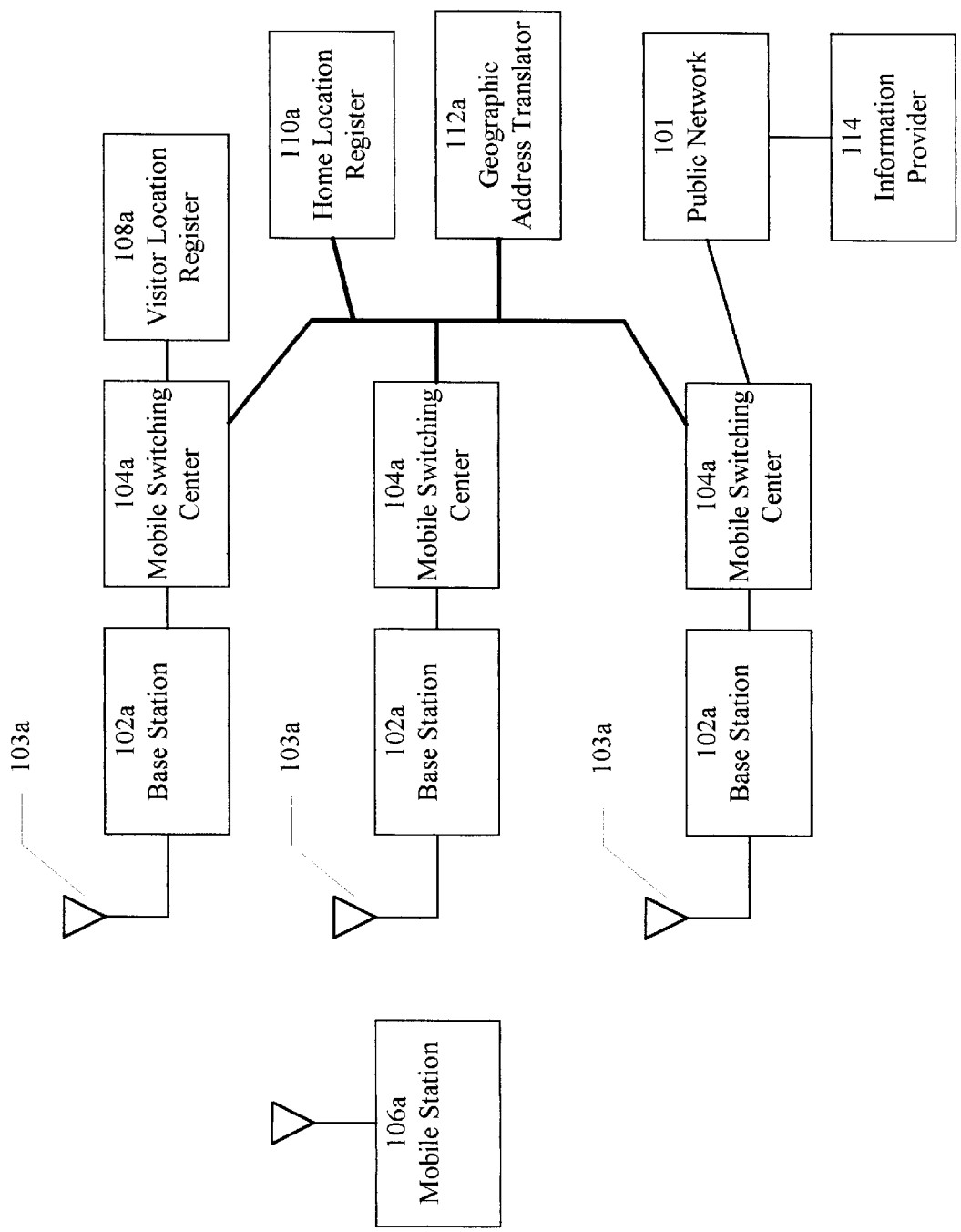
FIG. 1 is an exemplary block diagram of a mobile communications network, in accordance with the present invention.
Figure 3A:
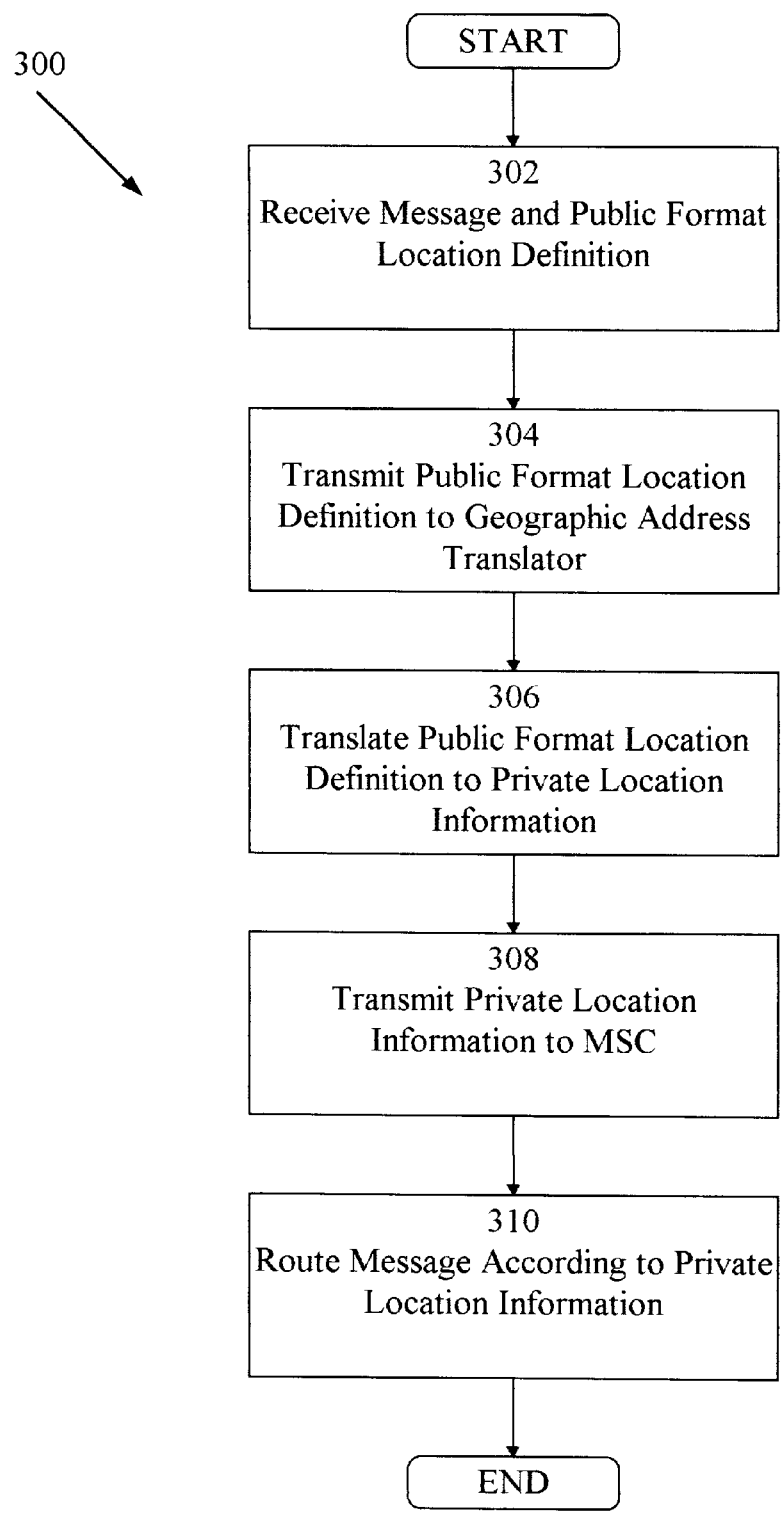

FIG. 3a is a flow diagram of an embodiment of a public-to-private address translation process 300 of the present invention, implemented by the system shown in FIG. 1.

Figure 3B:
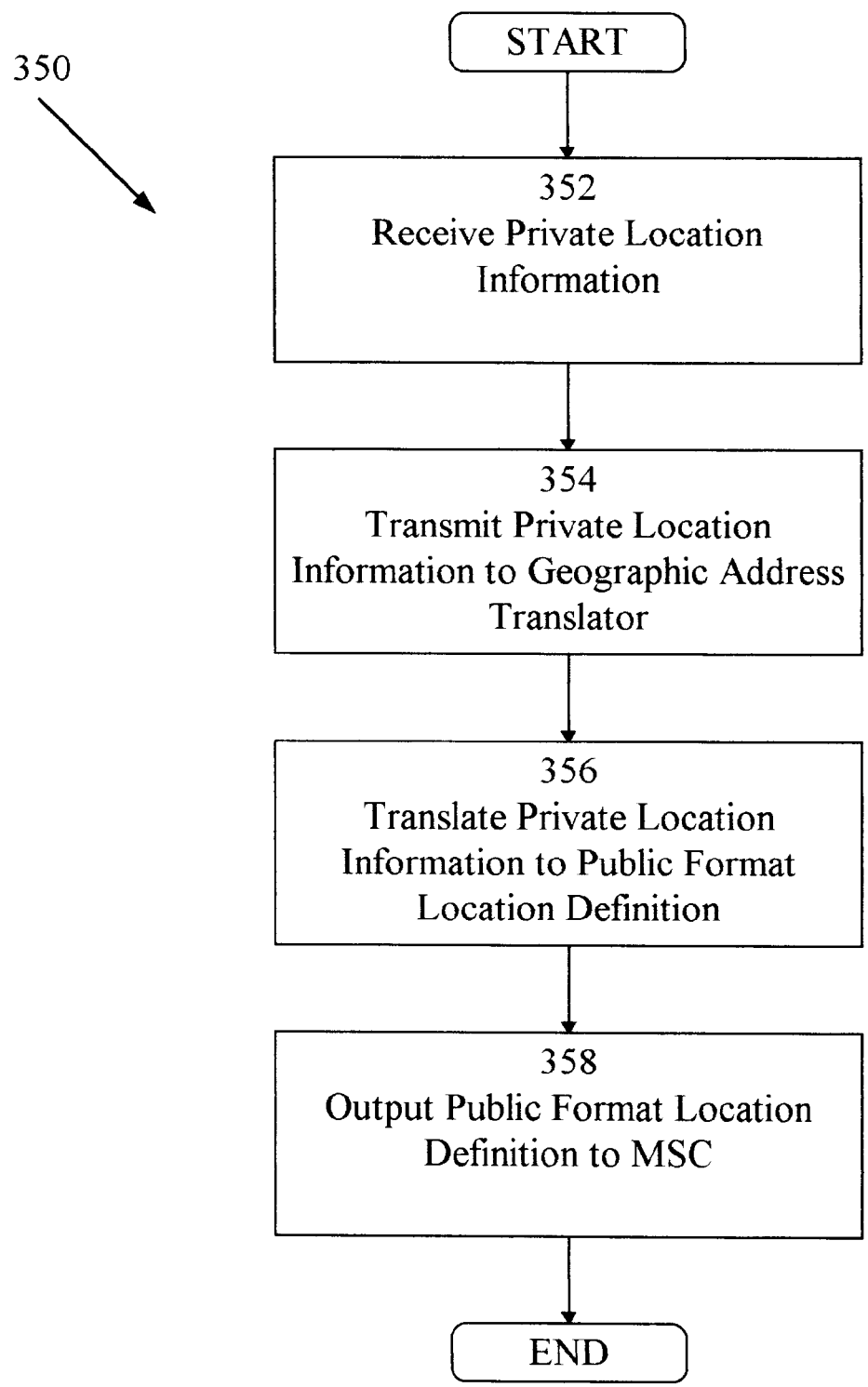

FIG. 3b is a flow diagram of a private-to-public address translation process 350 of the present invention, implemented by the system shown in FIG. 1.

Figure 3C:
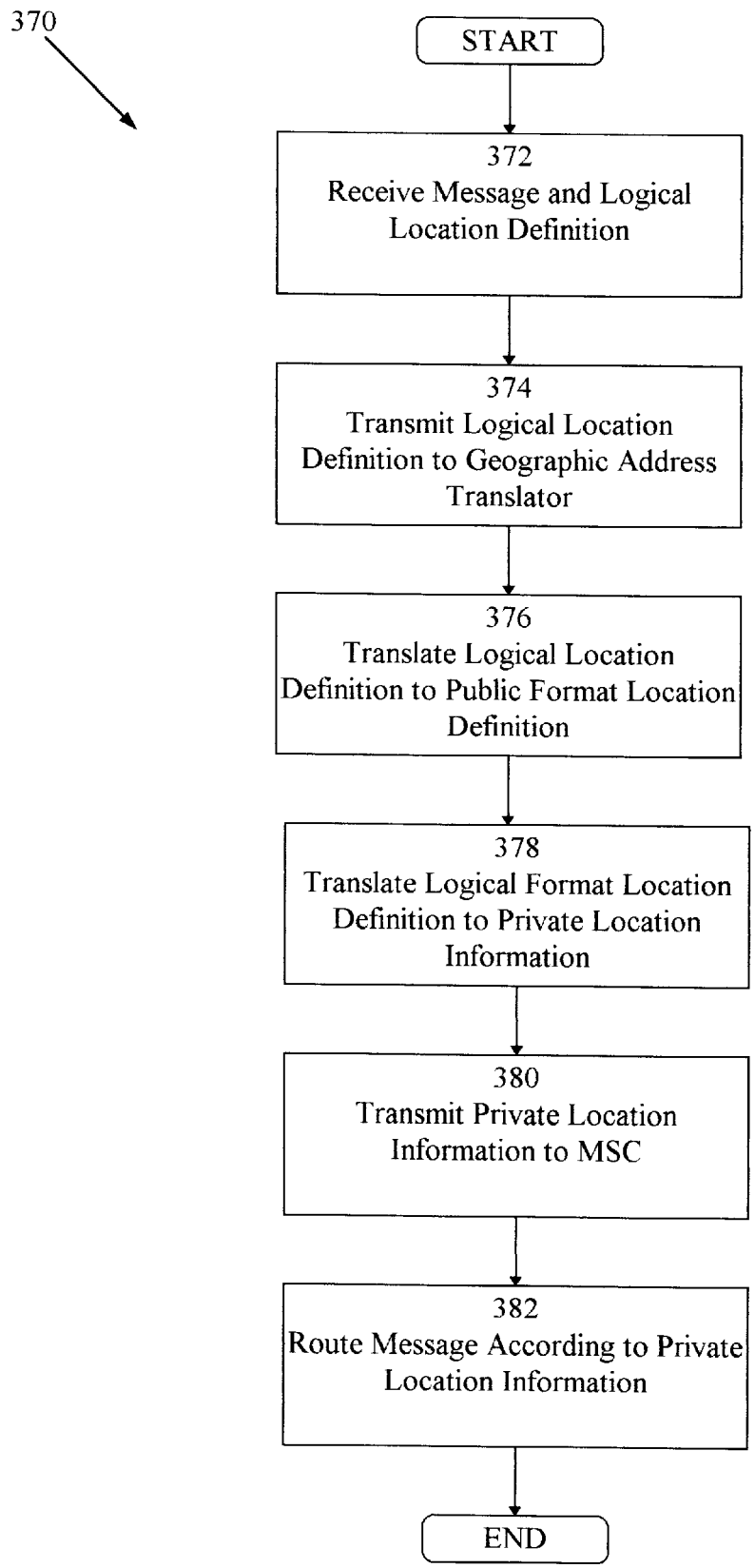

FIG. 3c is a flow diagram of another embodiment of a public-to-private address translation process 370 of the present invention, implemented by the system shown in FIG. 1.

Figure 4A:
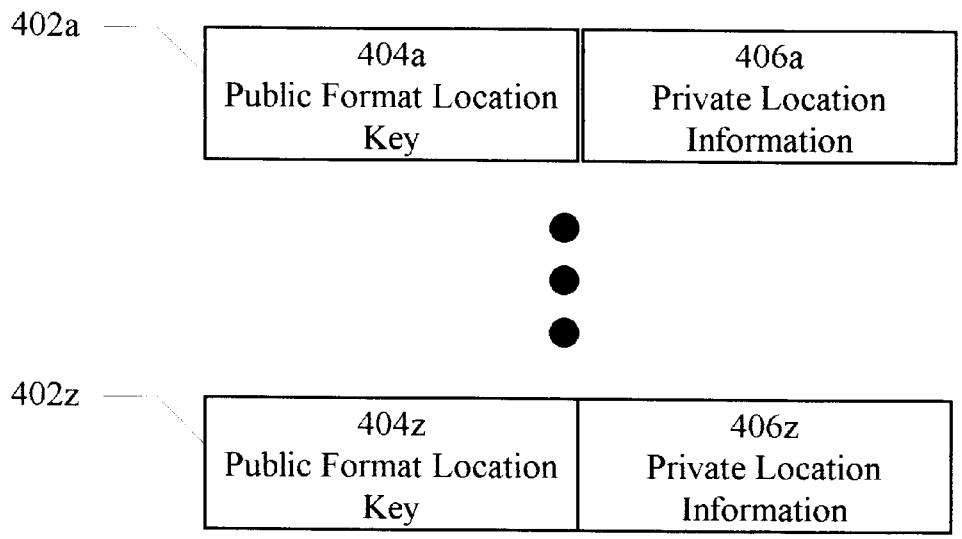

FIG. 4a is a format of a public to private translation database 267, which is contained in data partition 266 of FIG. 2b.

Figure 4B:
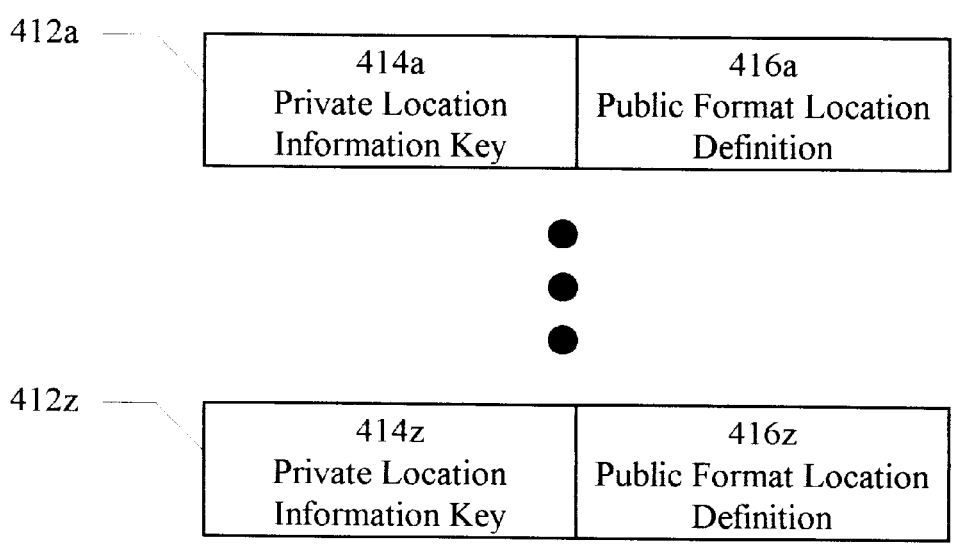

FIG. 4b is a format of a private to public translation database 269, which is contained in data partition 266 of FIG. 2b.

Figure 4C:
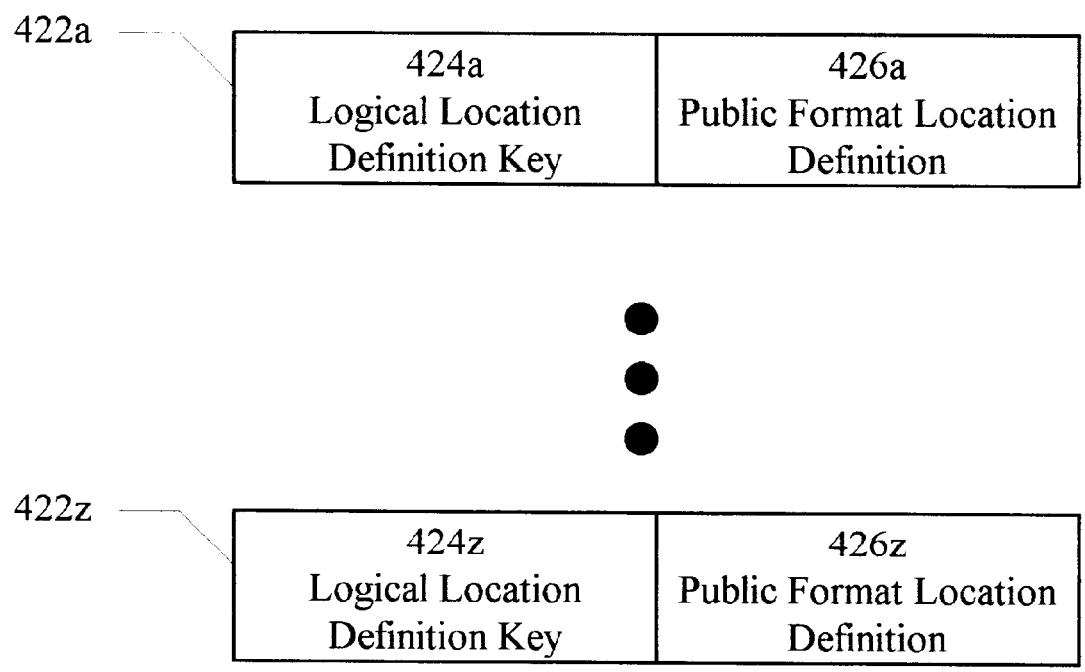

FIG. 4c is a format of a logical-to-geographic translation database 270, which is contained in data partition 266 of FIG. 2b.

DETAILED DESCRIPTION OF THE INVENTION

FIG. 1 is an exemplary block diagram of a mobile communications network, in accordance with the present invention. Such a mobile network includes a plurality of base stations 102a–z. Each base station 102 includes a plurality of base station transceivers which are part of a base station cluster controlled by a single base station controller. Each base station transceiver transmits and receives radio signals on its antenna 103 and each such transceiver antenna unit covers an area known as a cell. For much of the network, base station transceivers are organized in a seven cell or twelve cell repeat pattern with omni-directional coverage for each. Thus, seven or twelve base station transceivers are typically connected to each base station controller. Most base station transceivers have between 20 and 30 voice channels with one signaling channel carrying all of the paging and access functions per cell.

Each base station 102 is connected to a mobile switching center (MSC) 104. MSC 104 is a digital switching system with a distributed control architecture especially adapted for operation in the cellular environment. The base stations 102 are connected to the MSCs 104 over digital lines. The MSCs handle the switching of call traffic between base stations and the landline telephone network. MSCs are also connected by a signaling network 116, over which a variety of signaling message are communicated.

The system also includes a plurality of mobile stations 106 which receive and transmit radio signals with the antenna 114 of the base station 100.

Associated with each MSC 104 is a visitor location register (VLR) 108. Each MSC 104 typically has its own VLR 108, but this is not required. VLR 108 stores selected data relating to mobile stations 106 that are visiting within the home network associated with VLR 108 and its MSC 104. The data stored in VLR 108 is transferred from home location register (HLR) 110 to VLR 108 for each mobile station 106 within the home network of the VLR. This data can include the international mobile station identity (IMSI), the mobile station international ISDN number, and other information, including the current geographic location of the mobile station 106, and the services available to the mobile station 106, for example supplementary voice services or data services.

Each MSC 104 is associated with a home location register (HLR) 110 in the network. In principle there need be only one home location register 110 for the entire mobile network. In practice, there are generally several so as to accommodate the large quantity of data which is required to be stored in the HLR 110. The HLR 110 stores all management data relating to all of the mobile stations 106 in the network. This data includes the international mobile station identity (IMSI), the mobile station profile of capacities and services unique to the mobile station 106, and the location of the mobile station 106 within the overall mobile network. HLR 110 is connected over signaling network 116 to the MSCs 104 of all networks in the system.

The VLR servicing a geographic area is continually updated with the locations of every mobile station within its service area as each mobile station registers or otherwise communicates with the system. This location information is generally kept private to the mobile network and is termed private location information. In addition, the HLR is updated with the current serving MSC of each active mobile station allocated to it. This location is in the form of the particular cell—base station, base station transceiver, antenna—in which the mobile station is located.

Also connected to the mobile network is geographic address translator 112. When an information provider 114 wishes to transmit a broadcast message to the mobile stations in a geographic area, the information provider accesses the mobile network, typically through a public network such as the public switched telephone network or the Internet. The message may be an audio message or a text message. If the message is an audio message, the information provider obtains an audio connection to an MSC through the public network. If the message is a text message, the message may be transmitted and stored for broadcast or a connection may be established, depending upon the precise architecture of the system in use.

The information provider also provides information defining the geographic area in which the message is to be broadcast. The geographic definition may define a single contiguous geographic area. Such a definition is termed a public format location definition and comprises well-known forms of geographic information, such as, for example, latitude and longitude, public map coordinates, town, district, or neighborhood names, roads, street addresses, etc. The geographic definition may also define a plurality of geographic areas, whether contiguous or non-contiguous. Such a definition is termed a logical location definition and comprises other well-known forms of information, such as, for example, all sites belonging to a particular company. It is termed a logical location definition because the definition itself may not be explicitly geographic, but nonetheless defines geographic locations.

The message or connection and the public format or logical location definition enter the mobile network at an MSC. The MSC accesses geographic address translator 112 to obtain the private location information needed to route the message or connection to the particular cells necessary to cover the geographic area specified in the public format location definition.

Figure 2:
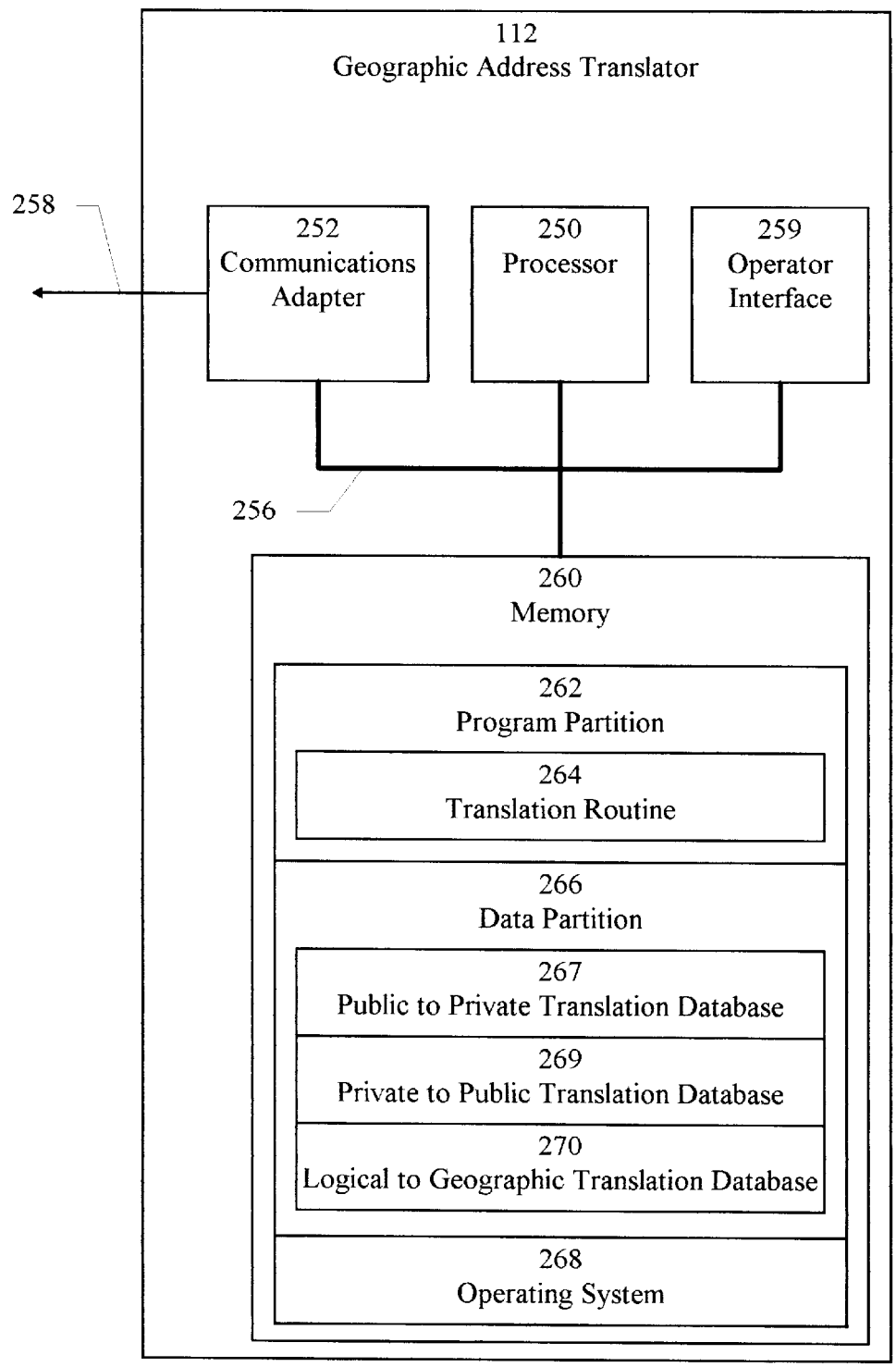
FIG. 2 is a more detailed block diagram of a geographic address translator 112, shown in FIG. 1.

FIG. 2 is a more detailed block diagram of a geographic address translator 112, shown in FIG. 1. Geographic address translator 204 includes several elements. Processor 250 executes program instructions and processes data. Memory 260 stores program instructions executed by and data processed by CPU 102-1. Memory 260 may include such devices as, for example, random access memories, read-only memories, hard disk drives, floppy disk drives, removable disk drives, magneto-optic drives, optical drives and tape drives. Communications adapter 252 communicates with other devices and transfers data in and out of geographic address translator 204 over communications link 258. Communications adapter 252 represents one or more communications adapters or network interfaces which may connect to local or wide area networks, such as, for example, Ethernet or Token Ring or to a signaling network, such as, for example, ANSI SS7. Geographic address translator 204 may also include operator interface 259, which provides status information to and accepts commands from a system operator. All these elements are interconnected by bus 256, which allows data to be intercommunicated between the elements.

Memory 260 is accessible by processor 250 over bus 256 and includes operating system 268, program partition 262 and data partition 266. Program partition 262 stores and allows execution by processor 250 of program instructions, including translation routine 264 which implements the translation of a public format location definition to private location information, translation of private location information to public format location definitions and translation of a logical location definition to public format location definitions. Data partition 266 is accessible by processor 250 and stores the databases used by translation routine 264 to perform the translation.

FIG. 3a is a flow diagram of one embodiment of a public-to-private address translation process 300 of the present invention, carried out by the system shown in FIG. 1. The process begins with step 302, in which an MSC receives a message to be broadcast and a public format location definition of the area in which the message is to be broadcast from an external information provider. In step 304, the MSC transmits a message containing the public format location definition to the geographic address translator. In step 306, the geographic address translator accesses its public-to-private translation database and translates the public format location definition into private location information. In step 308, the geographic address translator transmits a message containing the private location information to the MSC. In step 310, the MSC routes the message to the appropriate network elements as defined by the private location information.

FIG. 3b is a flow diagram of a private-to-public address translation process 350 of the present invention, implemented by the system shown in FIG. 1. The process begins with step 352, in which private location information identifying a particular location is received at an MSC. The private location information is most commonly an identifier of a particular cell, but may also be a sector or BTS identifier. In step 354, the MSC transmits a message containing the private location information to the geographic address translator. In step 356, the geographic address translator accesses its private-to-public translation database and translates the private location information into a public format location definition, such as a latitude and longitude, street address, etc. In step 358, the geographic address translator outputs the public format location definition as appropriate.

FIG. 3c is a flow diagram of another embodiment of a public-to-private address translation process 370 of the present invention, carried out by the system shown in FIG. 1. This process involves a two-step translation. The process begins with step 372, in which an MSC receives a message to be broadcast and a logical location definition of the area or areas in which the message is to be broadcast from an external information provider. For example, a logical location definition might specify all sites belonging to a particular company in a particular state, several states, country or region. In step 374, the MSC transmits a message containing the logical location definition to the geographic address translator. In step 376, the geographic address translator accesses its logical-to-geographic translation database and translates the logical location definition into one or more public format location definitions. For example, a logical location definition specifying a plurality of company sites might be translated into a plurality of public format location definitions, such as, latitude and longitude, street address, etc., or into public format location definitions of several types. In step 378, the geographic address translator accesses its public-to-private translation database and translates each public format location definition into private location information. In step 380, the geographic address translator transmits a message containing the private location information to the MSC. In step 382, the MSC routes the message to the appropriate network elements as defined by the private location information.

When the nature of the logical location definition allows, an embodiment in which logical location definitions are directly translated to private location information is also possible. In this embodiment, steps 376 and 378 of FIG. 3c are replaced by a single step of translating the logical location definition to private location information.

FIG. 4a is a format of a public-to-private translation database 267, which is contained in data partition 266 of FIG. 2. Database 267 includes a plurality of records 402a–z. Each record includes a public format location key field 404a and a private location information field 406a. The public format location key field contains key information used select records to access. This key information is various types of public format geographic information, such as, for example, latitude and longitude, public map coordinates, town, district or neighborhood names, roads, street addresses, etc. The private location information field contains geographic data which is private to the mobile network, such as, for example, wireless cells and sectors. During the translation process, the input public format location definition is matched with one or more entries in the public key field to select records containing the desired private information. The private location information for all selected records is assembled into a response message, which is transmitted to the requesting MSC.

FIG. 4b is a format of a private to public translation database 269, which is contained in data partition 266 of FIG. 2b. Database 269 contains a plurality of records 412a–z. Each record includes a private location information key field 414a and a public format location definition field 416a. The private location information key field contains key information used to select records to access. This key information is various types of geographic data which is private to the mobile network, such as, for example, wireless cells and sectors, and subsystems, e.g. wireless PBXs. The public format location definition field contains various types of public format geographic information, such as, for example, latitude and longitude, public map coordinates, town, district or neighborhood names, roads, street addresses, etc. During the translation process, the input private location information is matched with one or more entries in the private key field to select records containing the desired public information. The public format location definitions for all selected records is assembled into a response message, which is transmitted to the requesting MSC.

FIG. 4c is a format of a logical-to-geographic translation database 270, which is contained in data partition 266 of FIG. 2b. Database 270 includes a plurality of records 422a–z. Each record includes a logical location key field 424a and a public format location definition field 426a. The logical location key field contains key information used select records to access. This key information is various types of logical location information, such as, for example, all sites belonging to a particular company in a particular state, several states, country or region, etc. The public format location definition field contains various types of public format geographic information, such as, for example, latitude and longitude, public map coordinates, town, district or neighborhood names, roads, street addresses, etc. During the translation process, the input logical location definition is matched with one or more entries in the public key field to select records containing the desired public format location definitions. The public format location definitions for all selected records are then used as input to the public-to-private translation database, as described above.

Database 270 is used in the two-step translation embodiment of the process of translating from a logical location definition to private location information. In the one step embodiment, translation databases 267 and 270 of FIG. 2 may either be combined, or logical location definitions may be entered as keys into records in public-to-private translation database 267, in place of public format location keys.

Although specific embodiments of the present invention have been described, it will be understood by those of skill in the art that there are other embodiments which are equivalent to the described embodiment. Accordingly, it is to be understood that the invention is not to be limited by the specific illustrated embodiments, but only by the scope of the appended claims.

What is claimed is:

1. A method of providing a geographically-based service in a mobile network, comprising the steps of:
   receiving an indication of a geographic area, the geographic area being larger than a specific location;
   translating the indication of the geographic area to an indication of a portion of the mobile network corresponding to the geographic area; and
   transmitting an indication of the service to the indicated portion of the mobile network.

2. The method of claim 1, wherein the received indication of a geographic area is a public format location definition and the translating step comprises the step of translating the public format location definition to private location information.

3. The method of claim 1, wherein the received indication of a geographic area is a logical location definition specifying a plurality of geographic areas and the translating step comprises the step of translating the logical location information to private location information.

4. The method of claim 3, wherein the specified geographic areas are contiguous.

5. The method of claim 3, wherein the specified geographic areas are non-contiguous.

6. The method of claim 1, wherein the indication of a portion of the mobile network is an indication of a mobile network node.

7. A method of transmitting a broadcast message over a mobile network to a plurality of mobile stations within a geographic area, comprising the steps of:
   receiving an indication of the geographic area;
   translating the indication of the geographic area to an indication of a portion of the mobile network corresponding to the geographic area; and transmitting the broadcast message to the indicated portion of the mobile network.

8. The of claim 5, wherein received indication of a geographic area is a public format location definition and the translating step comprises the step of translating the public format location definition to private location information.

9. The method of claim 7, wherein the received indication of a geographic area is a logical location definition and the translating step comprises the step of translating the logical location information to private location information.

10. The method of claim 7, wherein the received indication of a geographic area is a logical location definition and the translating step comprises the steps of:
translating the logical location definition to at least one public format location definition; and
translating the at least one public format location definition to private location information.

11. The method of claim 7, wherein the indication of a portion of the mobile network is an indication of a mobile network node.

12. A system for providing a geographically-based service in a mobile network, comprising:
a receiver, receiving an indication of a geographic area, the geographic area being larger than a specific location;
a translator, coupled to the receiver, translating the indication of the geographic area to an indication of a portion of the mobile network corresponding to the geographic area; and
a transmitter, transmitting an indication of the service to the indicated portion of the mobile network.

13. The system of claim 12, wherein received indication of a geographic area is a public format location definition and the translator comprises a look-up table translating the public format location definition to private location information.

14. The system of claim 12, wherein the received indication of a geographic area is a logical location definition specifying a plurality of geographic areas and the translator comprises a look-up table translating the logical location information to private location information.

15. The system of claim 14, wherein the specified geographic areas are contiguous.

16. The method of claim 14, wherein the specified geographic areas are non-contiguous.

17. The system of claim 12, wherein the indication of a portion of the mobile network is an indication of a mobile network node.

18. A system for transmitting a broadcast message over a mobile network to a plurality of mobile stations within a geographic area, comprising the steps of:
a receiver, receiving an indication of the geographic area;
a translator, coupled to the receiver, translating the indication of the geographic area to an indication of a portion of the mobile network corresponding to the geographic area; and
a transmitter, transmitting the broadcast message to the indicated portion of the mobile network.

19. The system of claim 18, wherein received indication of a geographic area is a public format location definition and the translator comprises a look-up table translating the public format location definition to private location information.

20. The system of claim 18, wherein the received indication of a geographic area is a logical location definition and the translator comprises a look-up table translating the logical location information to private location information.

21. The system of claim 18, wherein the received indication of a geographic area is a logical location definition and the translator comprises:
a first look-up table translating the logical location definition to at least one public format location definition; and
a second look-up table translating the at least one public format location definition to private location information.

22. The system of claim 18, wherein the indication of a portion of the mobile network is an indication of a mobile network node.

23. A method of providing a geographically-based service in a mobile network, comprising the steps of:
receiving an indication of a geographic area;
translating the indication of the geographic area to an indication of a portion of the mobile network corresponding to the geographic area; and
transmitting an indication of the service to the indicated portion of the mobile network;
wherein the received indication of a geographic area is a logical location definition and the translating step comprises the steps of:
translating the logical location definition to at least one public format location definition; and
translating the at least one public format location definition to private location information.

24. A system for providing a geographically-based service in a mobile network, comprising:
a receiver, receiving an indication of a geographic area;
a translator, coupled to the receiver, translating the indication of the geographic area to an indication of a portion of the mobile network corresponding to the geographic area; and
a transmitter, transmitting an indication of the service to the indicated portion of the mobile network;
wherein the received indication of a geographic area is a logical location definition and the translator comprises:
a first look-up table translating the logical location definition to at least one public format location definition; and
a second look-up table translating the at least one public format location definition to private location information.

* * * * *

UNITED STATES PATENT AND TRADEMARK OFFICE
CERTIFICATE OF CORRECTION

PATENT NO. : 5,946,615
DATED : August 31, 1999
INVENTOR(S) : Holmes et al.

It is certified that error appears in the above-identified patent and that said Letters Patent is hereby corrected as shown below:

Title page,
Item [73], Assignee: AT&T Wireless" should read -- Assignee: AT&T Wireless Services, Inc. --.

Signed and Sealed this

First Day of April, 2003

JAMES E. ROGAN
*Director of the United States Patent and Trademark Office*